United States Patent
Kawai

(10) Patent No.: US 9,694,713 B2
(45) Date of Patent: Jul. 4, 2017

(54) ELECTRIC VEHICLE

(71) Applicant: KAWASAKI JUKOGYO KABUSHIKI KAISHA, Kobe-shi, Hyogo (JP)

(72) Inventor: Daisuke Kawai, Akashi (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 0 days.

(21) Appl. No.: 14/655,392

(22) PCT Filed: Dec. 27, 2012

(86) PCT No.: PCT/JP2012/008375
§ 371 (c)(1),
(2) Date: Jun. 25, 2015

(87) PCT Pub. No.: WO2014/102869
PCT Pub. Date: Jul. 3, 2014

(65) Prior Publication Data
US 2015/0329011 A1    Nov. 19, 2015

(51) Int. Cl.
*B60L 9/00* (2006.01)
*B60L 11/00* (2006.01)
(Continued)

(52) U.S. Cl.
CPC ............ *B60L 15/2054* (2013.01); *B60L 7/14* (2013.01); *B60L 11/1803* (2013.01);
(Continued)

(58) Field of Classification Search
CPC .... B60L 15/2054; B60L 7/14; B60L 11/1803; B60L 11/1877; B60L 15/08;
(Continued)

(56) References Cited

U.S. PATENT DOCUMENTS

| | | | |
|---|---|---|---|
| 2003/0052633 A1* | 3/2003 | Inagaki | H02P 25/098 318/432 |
| 2004/0038775 A1* | 2/2004 | Shimizu | B60K 6/44 477/6 |

(Continued)

FOREIGN PATENT DOCUMENTS

| | | |
|---|---|---|
| JP | 3208928 B | 9/2001 |
| JP | 2001352605 A | 12/2001 |

(Continued)

OTHER PUBLICATIONS www.reddit.com/r/askscience/comments/19wuqt/why_do_electric_motors_have_maximum_torque_at_low/.*

(Continued)

*Primary Examiner* — Calvin Cheung
*Assistant Examiner* — Paula L Schneider
(74) *Attorney, Agent, or Firm* — Alleman Hall Creasman & Tuttle LLP

(57) ABSTRACT

An electric motorcycle includes an electric motor, a manual transmission, a shift drum potentiometer, and an ECU. When it is determined based on an input from the shift drum potentiometer that a transmission manipulation has been performed, the ECU executes a first control operation when switching from a power transmission state to a power cut state and executes a second control operation when returning from the power cut state to the power transmission state. In the first control operation, the ECU controls an operation of the electric motor to facilitate disengagement of an engagement mechanism from a gear train of the manual transmission. In the second control operation, for facilitating engagement of the engagement mechanism with a different gear train, the ECU controls the operation of the electric motor to make a revolving speed of the different gear train close to the revolving speed of the engagement mechanism.

15 Claims, 7 Drawing Sheets

(51) Int. Cl.
*G05D 1/00* (2006.01)
*G05D 3/00* (2006.01)
*G06F 7/00* (2006.01)
*G06F 17/00* (2006.01)
*B60L 15/20* (2006.01)
*B60L 15/08* (2006.01)
*B60W 10/08* (2006.01)
*B60W 10/11* (2012.01)
*B60W 30/19* (2012.01)
*F16H 61/04* (2006.01)
*F16H 63/50* (2006.01)
*B62M 7/02* (2006.01)
*B60L 7/14* (2006.01)
*B60L 11/18* (2006.01)
*F16H 63/18* (2006.01)

(52) U.S. Cl.
CPC .......... *B60L 11/1877* (2013.01); *B60L 15/08* (2013.01); *B60L 15/2009* (2013.01); *B60W 10/08* (2013.01); *B60W 10/11* (2013.01); *B60W 30/19* (2013.01); *B62M 7/02* (2013.01); *F16H 61/0403* (2013.01); *F16H 63/502* (2013.01); *B60L 2200/12* (2013.01); *B60L 2240/12* (2013.01); *B60L 2240/421* (2013.01); *B60L 2240/423* (2013.01); *B60L 2240/486* (2013.01); *B60L 2240/507* (2013.01); *B60L 2240/80* (2013.01); *B60L 2250/24* (2013.01); *B60L 2270/145* (2013.01); *B60Y 2200/12* (2013.01); *B60Y 2400/71* (2013.01); *B62K 2204/00* (2013.01); *F16H 63/18* (2013.01); *F16H 2061/0422* (2013.01); *F16H 2306/44* (2013.01); *F16H 2306/48* (2013.01); *F16H 2306/52* (2013.01); *Y02T 10/705* (2013.01); *Y02T 10/7005* (2013.01); *Y02T 10/72* (2013.01); *Y02T 10/7275* (2013.01)

(58) Field of Classification Search
CPC ... B60L 15/2009; B60W 10/08; B60W 10/11; B60W 30/19; B62M 7/02; F16H 61/0403; F16H 63/502
USPC .......................................................... 701/22
See application file for complete search history.

(56) References Cited

U.S. PATENT DOCUMENTS

2015/0329011 A1\* 11/2015 Kawai ..................... B62M 7/02
 701/22
2016/0016587 A1\* 1/2016 Saji ..................... F16H 61/0206
 477/115

FOREIGN PATENT DOCUMENTS

| JP | 2003226163 A | 8/2003 |
| JP | 2010193542 A | 9/2009 |

OTHER PUBLICATIONS

ISA Japanese Patent Office, International Search Report Issued in Application No. PCT/JP2012/008375, Feb. 19, 2013, WIPO, 4 pages.

\* cited by examiner

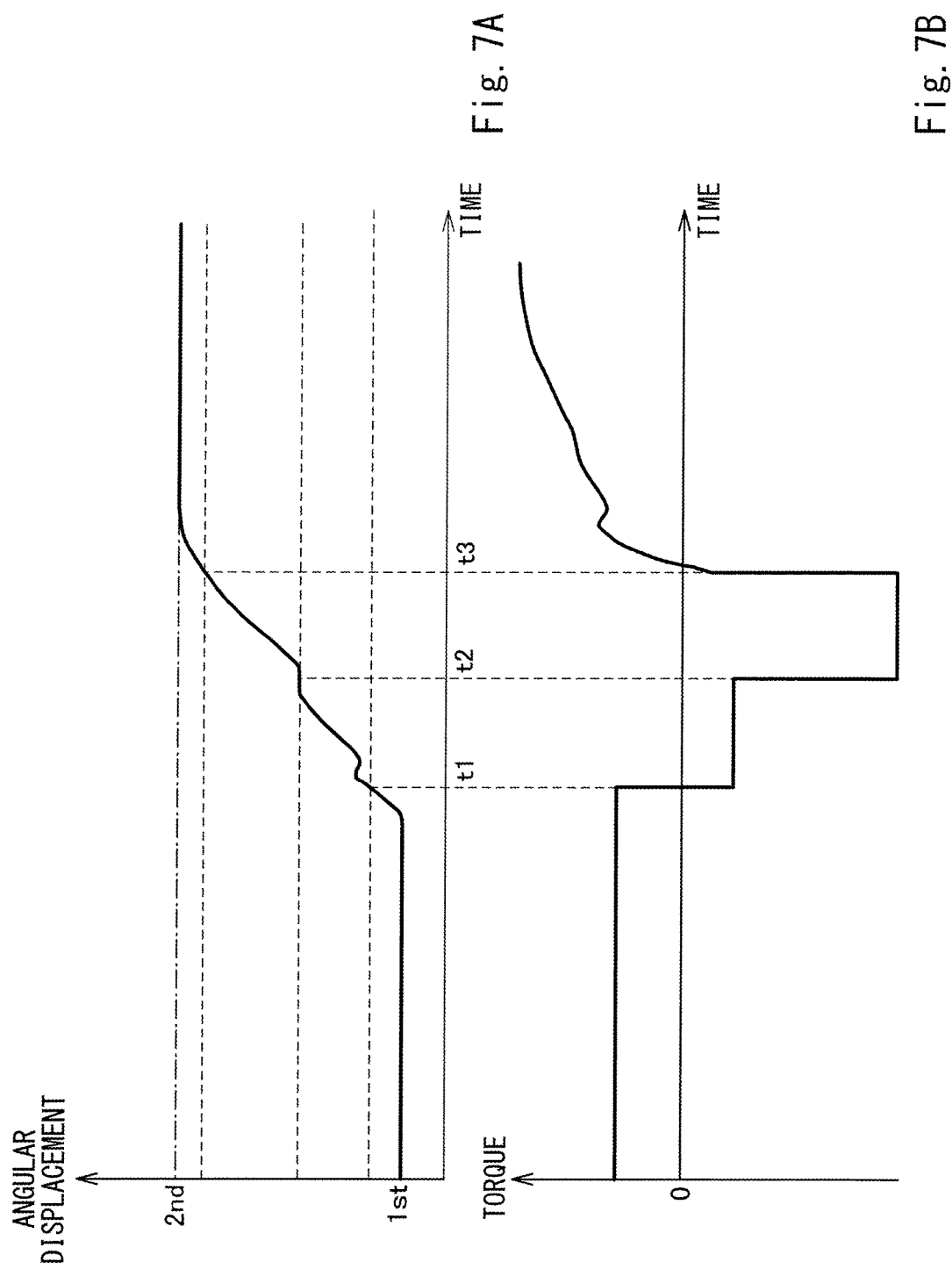

ELECTRIC VEHICLE

TECHNICAL FIELD

The present invention relates to an electric vehicle configured such that: torque generated by an electric motor is transmitted via a transmission device to a driving wheel; and the driving wheel is driven by the transmitted torque.

BACKGROUND ART

An electric car including a transmission device is known. One example is an electric car described in PTL 1. According to the electric car described in PTL 1, a clutch is interposed between an electric motor and a manual transmission device. When the clutch is disengaged, a revolving speed of the electric motor is controlled so as to correspond to the revolving speed of a clutch disc at the driving wheel side.

CITATION LIST

Patent Literature

PTL 1: Japanese Patent No. 3208928

SUMMARY OF INVENTION

Technical Problem

In some cases, a transmission manipulation is performed without disengaging the clutch. In such cases, according to the electric car described in PTL 1, the revolving speed of the electric motor is not controlled in the transmission manipulation. In addition, an engagement mechanism (dog) and a transmission gear train which engage with each other press against each other, so that the engagement mechanism is not smoothly disengaged from the transmission gear train. Therefore, in some cases, it is difficult to release the engagement, and a transmission operation cannot be smoothly performed.

An object of the present invention is to provide an electric vehicle capable of suppressing transmission shock and smoothly performing a transmission operation regardless of an operation of cutting a power transmission path connecting an electric motor and a transmission gear train.

Solution to Problem

An electric vehicle of the present invention includes: an electric motor configured to generate torque for rotating a driving wheel; a transmission device configured to switch over speed ratios in accordance with a switching command from a rider and transmit the torque of the electric motor to the driving wheel at the switched speed ratio; a switching command detector configured to detect whether or not the switching command is input; and a controller configured to control an operation of the electric motor, wherein: the transmission device includes an input shaft configured to rotate in conjunction with the electric motor, an output shaft configured to rotate in conjunction with the driving wheel, a plurality of transmission gear trains, each of which is provided so as to extend between the input shaft and the output shaft and whose speed ratios are different from one another, and an engagement mechanism configured to selectively engage with any one of the plurality of transmission gear trains and switch between a power transmission state and a power cut state, the power transmission state being a state where the engagement mechanism engages with any one of the transmission gear trains to perform power transmission between the input shaft and the output shaft, the power cut state being a state where the engagement mechanism does not engage with any of the plurality of transmission gear trains to cut the power transmission between the input shaft and the output shaft, wherein the engagement mechanism switches from the power transmission state to the power cut state by the switching command and engages with a newly selected transmission gear train to return to the power transmission state and therefore switch the speed ratio; and in a case where the controller determines based on a detection result of the switching command detector that the switching command is input, for facilitating disengagement of the engagement mechanism from the transmission gear train when switching from the power transmission state to the power cut state, the controller executes a first control operation of controlling an operation of the electric motor, and for facilitating engagement of the engagement mechanism with the newly selected transmission gear when returning from the power cut state to the power transmission state, the controller executes a second control operation of controlling the operation of the electric motor to make a revolving speed of the newly selected transmission gear train close to the revolving speed of the engagement mechanism.

According to the present invention, the disengagement of the engagement mechanism from the transmission gear train is facilitated by the first control operation, and the engagement of the engagement mechanism with the transmission gear train is facilitated by the second control operation. With this, regarding a power transmission path through which power is transmitted from the electric motor to the driving wheel, the transmission shock can be suppressed and the transmission manipulation can be smoothly performed regardless of the operation of separating the electric motor and the transmission gear from each other.

In the above invention, the electric vehicle may be configured such that: the switching command detector detects whether the switching command is a shift-down command or a shift-up command; when the switching command detector detects that the switching command is the shift-down command, the controller controls the operation of the electric motor in the second control operation such that the revolving speed of the input shaft is made higher than the revolving speed of the input shaft at the time of the input of the switching command; and when the switching command detector detects that the switching command is the shift-up command, the controller controls the operation of the electric motor in the second control operation such that the revolving speed of the input shaft is made lower than the revolving speed of the input shaft at the time of the input of the switching command.

According to the above configuration, the revolving speed of the engagement mechanism can be made close to the revolving speed of the transmission gear train with which the engagement mechanism engages after the transmission operation. Whether the shift-down command or the shift-up command is input, the transmission shock at the time of the engagement can be suppressed.

In the above invention, the electric vehicle may be configured such that: the transmission device includes an engagement state detector configured to detect whether or not the transmission gear train and the engagement mechanism are engaged with each other; when the engagement state detector detects in the first control operation that the transmission gear train and the engagement mechanism are not engaged with each other, the controller proceeds to the second control operation; and when the engagement state detector detects in the second control operation that the transmission gear train and the engagement mechanism are engaged with each other, the controller terminates the second control operation.

According to the above configuration, it is possible to prevent a case where the process proceeds to the second control operation before the release of the engagement, and therefore, the engagement cannot be released. Further, it is possible to prevent a case where the second control operation terminates before the engagement, and therefore, the revolving speed of the engagement mechanism becomes different from the revolving speed of the transmission gear train with which the engagement mechanism engages after the transmission operation.

In the above invention, the electric vehicle may be configured such that when a predetermined transition time has elapsed in the first control operation, the controller proceeds to the second control operation.

According to the above configuration, it is possible to prevent the first control operation from being continuously performed.

In the above invention, the electric vehicle may be configured such that: when a predetermined termination time has elapsed in the first control operation, the controller terminates the first control operation; and when a predetermined termination time has elapsed in the second control operation, the controller terminates the second control operation.

According to the above configuration, it is possible to prevent a case where the transmission control does not terminate but continues.

A transmission control method of an electric vehicle of the present invention is a transmission control method of an electric vehicle including a constant-mesh type transmission device, the method including: a switching determining step of determining a transmission switching command input by a rider; a first control operation step of, when it is determined in the switching determining step that the transmission switching command is input, controlling an operation of an electric motor before the transmission switching command to reduce torque of the electric motor; and a second control operation step of, after the first control operation step, controlling the operation of the electric motor to make a revolving speed of a dog close to the revolving speed of a transmission gear train with which the dog meshes after a transmission operation.

According to the above configuration, regarding the power transmission path through which the power is transmitted from the electric motor to the driving wheel, the transmission shock can be suppressed and the transmission manipulation can be smoothly performed regardless of the operation of separating the electric motor and the transmission gear from each other.

Advantageous Effects of Invention

According to the present invention, the transmission shock can be suppressed and the transmission manipulation can be smoothly performed regardless of the operation of cutting the power transmission path connecting the electric motor and the transmission gear train.

BRIEF DESCRIPTION OF DRAWINGS

FIGS. 7A and 7B are graphs respectively showing one example of a change in a rotation angle of the shift drum at the time of a transmission operation and a change in motor torque at the time of the transmission operation.

DESCRIPTION OF EMBODIMENTS

Hereinafter, an electric motorcycle 1 according to an embodiment of the present invention will be explained in reference to the drawings. Directions stated in the following explanations are from the perspective of a rider straddling the motorcycle 1. However, these directions are used for convenience sake, and directions regarding the configuration of the present invention are not limited. Further, the electric motorcycle 1 explained below is just one embodiment of the present invention. Therefore, the present invention is not limited to the embodiment, and additions, deletions, and modifications may be made within the scope of the present invention.

Motorcycle

Figure 1:
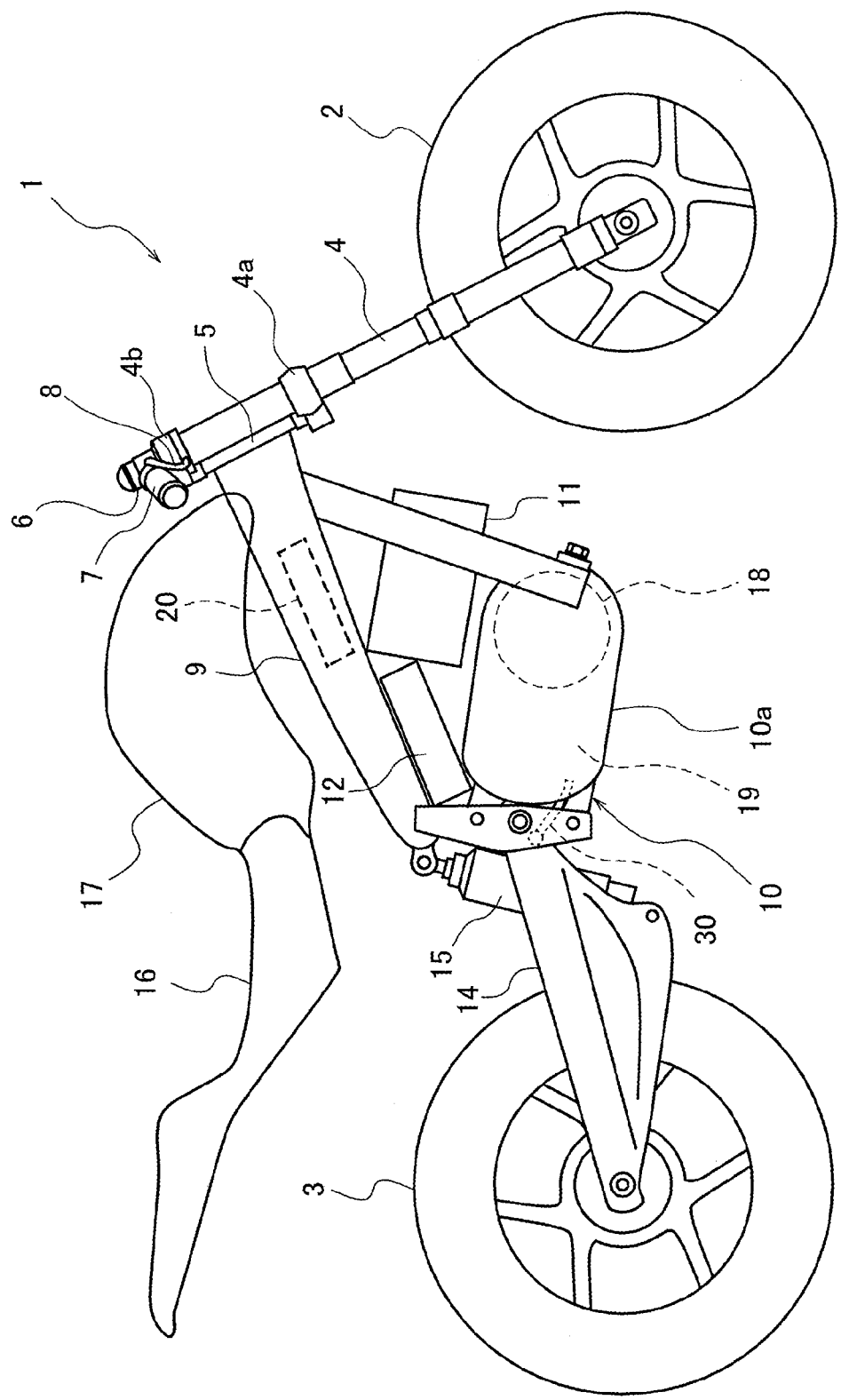
FIG. 1 is a right side view showing an electric motorcycle according to an embodiment of the present invention.

As shown in FIG. 1, the electric motorcycle 1 includes a front wheel 2 as a driven wheel and a rear wheel 3 as a driving wheel. The front wheel 2 is rotatably supported by a lower end portion of a front fork 4. An upper portion of the front fork 4 is supported by a steering shaft (not shown) via a pair of upper and lower brackets 4a and 4b. The steering shaft is inserted in a head pipe 5 at a vehicle body side to be rotatably supported by the head pipe 5. A bar-type handle 6 extending in a left/right direction is attached to the upper bracket 4b. An accelerator grip 7 is provided at a right portion of the handle 6. The accelerator grip 7 is held by a right hand of the rider and rotated by twisting of a wrist of the rider. A brake manipulating element 8 (brake lever) is provided in front of the accelerator grip 7.

A power unit 10, a battery 11, and an inverter 12 are supported by a vehicle body frame 9 of the electric motorcycle 1. A front portion of a swing arm 14 supporting the rear wheel 3 is supported by a rear portion of the vehicle body frame 9 such that the swing arm 14 is swingable. A rear suspension 15 is interposed between an intermediate portion of the swing arm 14 and the vehicle body frame 9. A seat 16 straddled by the rider is provided above the swing arm 14. The seat 16 is supported by a seat rail (not shown) connected to the vehicle body frame 9. A dummy tank 17 sandwiched by both knees of the rider is provided in front of the seat 16.

Figure 2:
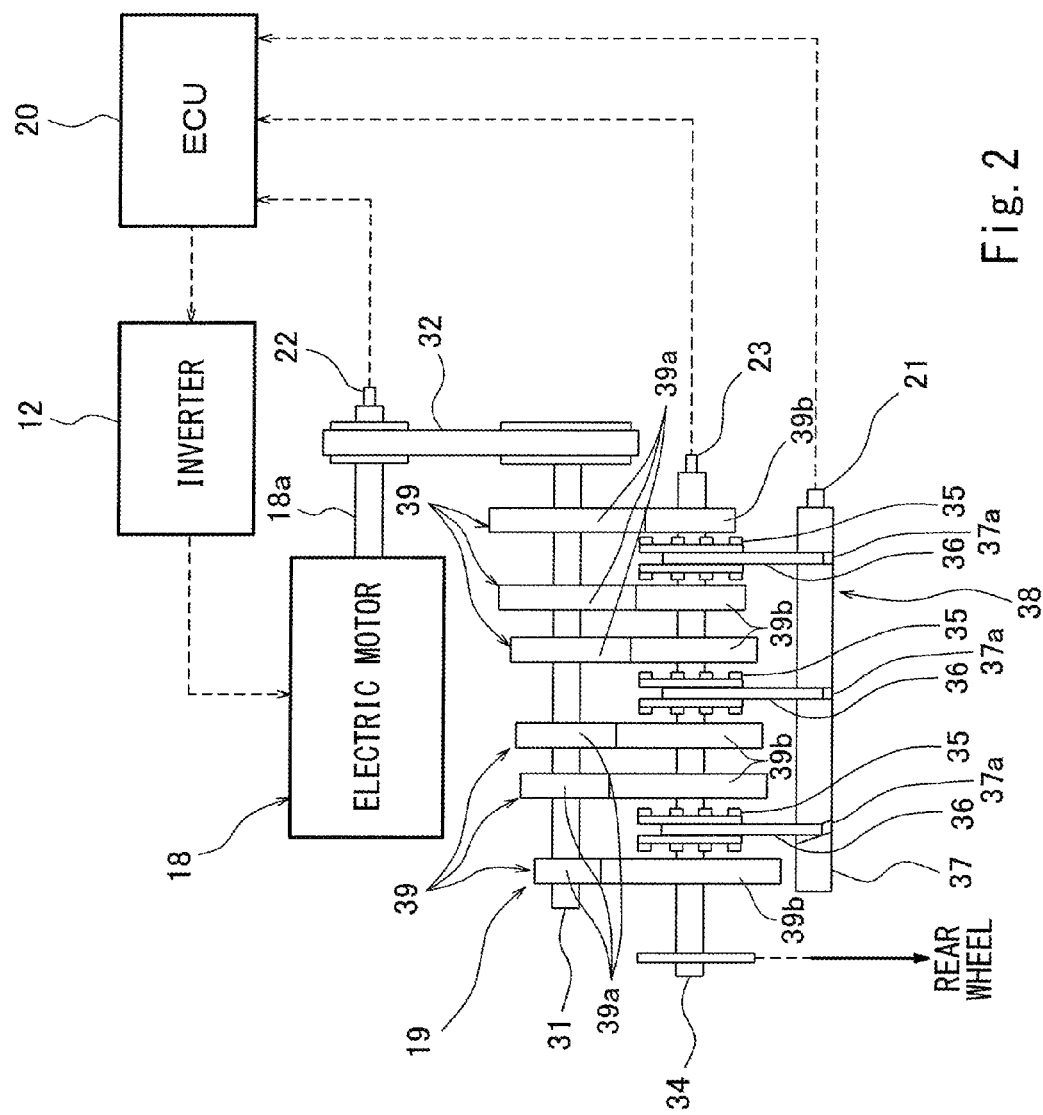
FIG. 2 is a schematic diagram showing a power transmission system of the electric motorcycle.

An electric motor 18 and a manual transmission 19 are accommodated in a casing 10a of the power unit 10. The electric motor 18 is connected to the battery 11 through the inverter 12. By electric power supplied from the battery 11, the electric motor 18 generates torque for rotating the rear wheel 3. The inverter 12 is connected to a below-described ECU 20. The ECU 20 is provided under the dummy tank 17. The ECU 20 controls an operation of the inverter 12 in accordance with an accelerator manipulation amount of the accelerator grip 7 as described below to cause the electric motor 18 to generate the torque corresponding to the accelerator manipulation amount. The manual transmission 19 can switch over speed ratios as described below. The manual transmission 19 transmits the torque of the electric motor 18 to the rear wheel 3 at the switched speed ratio. Hereinafter, a power transmission system including the components between the electric motor 18 and the driving wheel 3 will be explained in reference to FIG. 2.

An output shaft 18a of the electric motor 18 is connected to an input shaft 31 of the manual transmission 19 through a motor-side power transmission mechanism 32 (such as a pulley/belt mechanism, a gear, or a chain). The power transmission mechanism 32 transmits the torque of the electric motor 18 to the input shaft 31. A plurality of gear trains 39 having different speed ratios are provided at the input shaft 31. Each of the gear trains 39 is provided so as to extend between the input shaft 31 and an output shaft 34 provided in parallel with the input shaft 31. Each of the gear trains 39 transmits the torque of the input shaft 31 to the output shaft 34. A wheel-side power transmission mechanism (such as a chain/sprocket mechanism or a drive shaft mechanism) not shown is provided at an end portion of the output shaft 34. The torque transmitted to the output shaft 34 is transmitted to the rear wheel 3 via the wheel-side power transmission mechanism. With this, the rear wheel 3 rotates in conjunction with the output shaft 34.

The gear trains 39 will be explained in more detail. Each of the gear trains 39 includes an input gear 39a and an output gear 39b. The input gear 39a is fixed to the input shaft 31 and rotates integrally with the input shaft 31. The input gear 39a constantly meshes with the output gear 39b. The output gear 39b is externally attached to the output shaft 34 so as to be rotatable relative to the output shaft 34. To rotate the output gear 39b integrally with the output shaft 34, a gear shifter 38 is provided at the manual transmission 19 that is a constant-mesh type transmission.

The gear shifter 38 that is an engagement mechanism operates in conjunction with a transmission manipulation of a shift pedal 30 (see FIG. 1) provided in the vicinity of a left foot side of the electric motorcycle 1. The gear shifter 38 engages with a selected one of a plurality of output gears 39b to realize power transmission between the input shaft 31 and the output shaft 34. In other words, the manual transmission 19 can switch over the gear trains 39 by the manipulation of the shift pedal 30, the gear trains 39 performing the power transmission between the input shaft 31 and the output shaft 34. To be specific, the manual transmission 19 can switch over transmission stages.

The gear shifter 38 will be explained in more detail. The gear shifter 38 includes a shift drum 37, shift forks 36, and a plurality of dog gears 35. The shift drum 37 has a substantially columnar shape. A plurality of grooves 37a (three grooves 37a in the present embodiment) extending in a circumferential direction of the shift drum 37 are formed on an outer peripheral surface of the shift drum 37. The shift forks 36 are respectively inserted in these three grooves 37a such that tip end portions of the shift forks 36 project. When the shift drum 37 is rotated, the shift forks 36 move along the shapes of the grooves 37a. When the shift forks 36 move, the shift forks 36 move along the output shaft 34 in an axial direction of the output shaft 34. The tip end portions of the shift forks 36 are fitted in the dog gears 35.

The dog gears 35 (also called dog clutches) are provided at the output shaft 34 so as to correspond one to one with the output gears 39b. The dog gears 35 are externally attached to the output shaft 34 so as to rotate integrally with the output shaft 34 and slide relative to the output shaft 34 in the axial direction of the output shaft 34. To be specific, the dog gears 35 are fixed to the output shaft 34 in a coaxial rotation direction and are slidable relative to the output shaft 34 in the axial direction of the output shaft 34. The dog gear 35 configured as above moves along the output shaft 34 together with the corresponding shift fork 36. When the shift fork 36 moves toward the corresponding output gear 39b, the dog gear 35 engages with the output gear 39b.

Figure 4A:
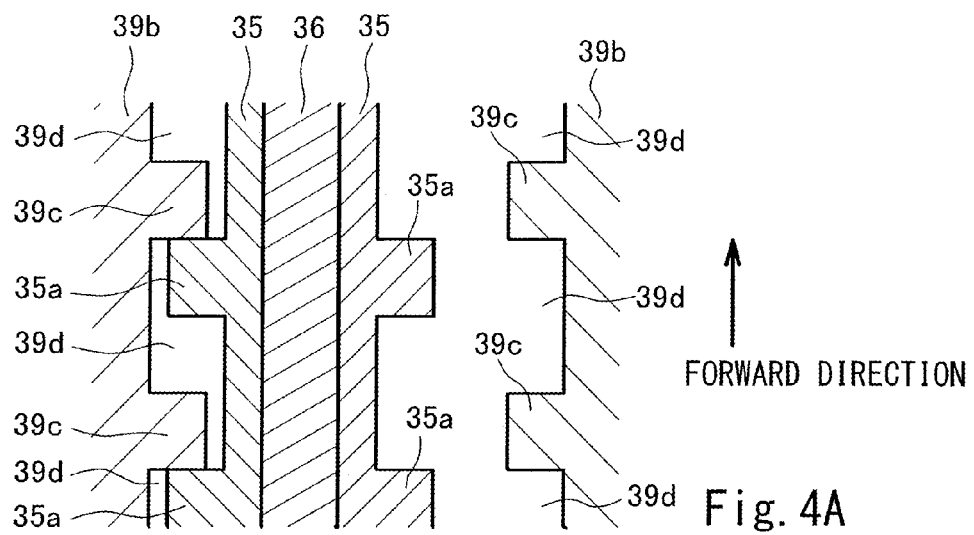
FIGS. 4A to 4C are enlarged views each showing an engagement state between a dog gear and an output gear.
Figure 4B:
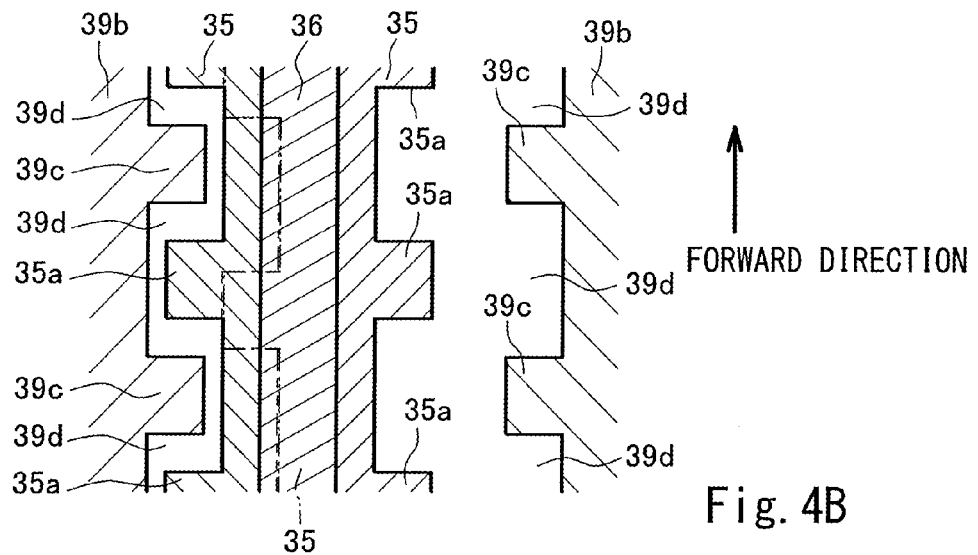
Figure 4C:
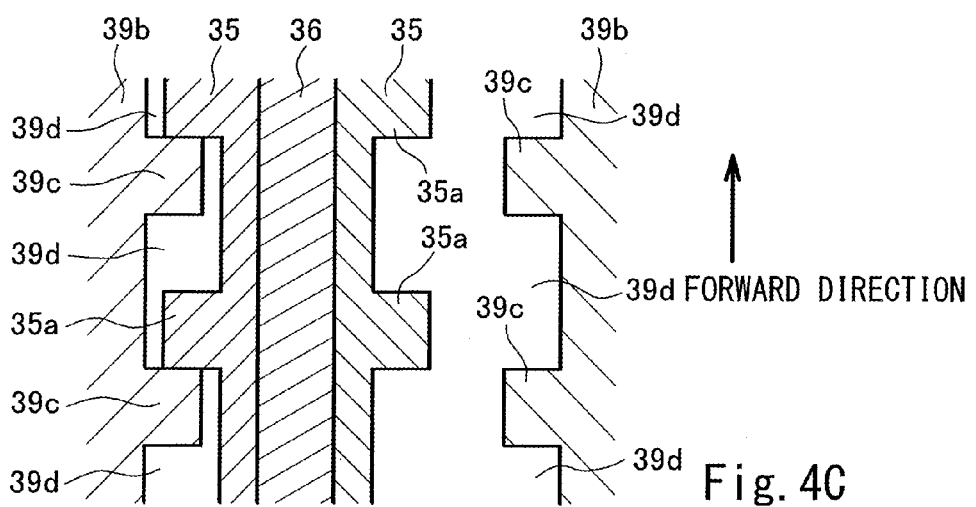

The engagement between the dog gear 35 and the output gear 39b will be explained in detail in reference to FIGS. 4A to 4C. FIG. 4A is an enlarged view showing a state where an engaging portion of the dog gear and the output gear engage with each other in a forward direction. FIG. 4B is an enlarged view showing a state where the engaging portion of the dog gear and an engaging portion of the output gear are separated from each other in a rotation direction. FIG. 4C is an enlarged view showing a state where the engaging portion of the dog gear and the output gear engage with each other in a backward direction. A main surface that is an axial end surface of the dog gear 35 opposes a main surface that is an axial end surface of the output gear 39b. When the shift fork 36 moves along the output shaft 34, the main surface of the dog gear 35 and the main surface of the output gear 39b contact each other. As shown in FIGS. 4A to 4C, the dog gear 35 includes a plurality of engaging portions 35a on the main surface thereof, and the output gear 39b includes a plurality of engaging portions 39c on the main surface thereof. The engaging portions 35a and 39c are arranged such that each interval between the engaging portions 35a in the circumferential direction and each interval between the engaging portions 39c in the circumferential direction are the same as each other. With this, each of engagement grooves 39d is formed between the adjacent engaging portions 39c of the output gear 39b. In a case where the shift fork 36 moves along the output shaft 34, and this causes the main surface of the dog gear 35 and the main surface of the output gear 39b to contact each other, the engaging portion 35a of the dog gear 35 engages with the engagement groove 39d with a backlash (see FIG. 4A, for example).

When the dog gear 35 and the output gear 39b engage with each other as above, the engaged output gear 39b rotates integrally with the output shaft 34, so that the torque of the input shaft 31 is transmitted to the output shaft 34 via the gear train 39 (power transmission state). In contrast, when the shift fork 36 moves in a direction away from the corresponding output gear 39b, the dog gear 35 is disengaged from the output gear 39b, so that the engagement is released. In this case, the output gear 39b freely rotates relative to the output shaft 34, so that the torque transmission between the input shaft 31 and the output shaft 34 is cut (power cut state). The manual transmission 19 is a so-called non-synchronous type transmission. If the revolving speed of the dog gear 35 and the revolving speed of the output gear 39b are significantly different from each other when engaging the dog gear 35 and the output gear 39b with each other, the dog gear 35 and the output gear 39b cannot engage with each other.

As described above, by rotating the shift drum 37 to move the shift fork 36, the gear shifter 38 can switch the state of the dog gear 35 between an engagement state and a non-engagement state. To be specific, the manual transmission 19 can switch its state to any one of the power transmission state and the power cut state. According to the manual transmission 19 configured as above, when the shift drum 37 is rotated, the shift forks 36 sequentially move along the grooves 37a. With this, the dog gears 35 engage with or separate from the corresponding output gears 39b in order. Hereinafter, the shift drum 37 which moves the shift forks 36 in order will be explained in more detail.

The shift pedal 30 configured to be swingable is coupled to the shift drum 37. The shift drum 37 rotates in conjunction with the transmission manipulation of the shift pedal 30 by the rider. For example, when the transmission manipulation (i.e., a shift-up manipulation) of swinging the shift pedal 30 toward one side along a predetermined direction is performed, the shift drum 37 is angularly displaced in a shift-up direction. When the transmission manipulation (i.e., a shift-down manipulation) of swinging the shift pedal 30 toward the other side along the predetermined direction is performed, the shift drum 37 is angularly displaced in a direction opposite to the shift-up direction, that is, in a shift-down direction.

The manual transmission 19 is a so-called sequential transmission. When the transmission manipulation is performed, the manual transmission 19 can switch the transmission stages in order. First to sixth drum angular positions (first to sixth speeds) corresponding to the transmission stages are set in the shift drum 37 in order in the shift-up direction. A neutral position is set between the first drum angular position and the second drum angular position. At each of the drum angular positions, only one dog gear 35 corresponding to this drum angular position engages with the corresponding output gear 39b, and the other dog gears 35 are separated from the corresponding output gears 39b. When the shift drum 37 is angularly displaced from the above drum angular position, the engaging dog gear 35 is disengaged from the output gear 39b. Thus, all the dog gears 35 are disengaged from the output gears 39b. When the shift drum 37 is further angularly displaced to reach the adjacent drum angular position, the dog gear 35 and the output gear 39b which correspond to this drum angular position engage with each other.

According to the manual transmission 19 configured as above, the shift drum 37 is angularly displaced to the desired drum angular position by the transmission manipulation of the shift pedal 30 by the rider (i.e., by a switching command). In this case, only the shift fork 36 corresponding to the desired drum angular position is guided by the groove 37a to slide along the output shaft 34, and the dog gear 35 corresponding to the desired drum angular position engages with the corresponding output gear 39b. With this, the power transmission state in which the torque is transmitted between the input shaft 31 and the output shaft 34 is realized. Thus, the torque transmission between the input shaft 31 and the output shaft 34 can be performed at the selected speed ratio. As above, the dog gear 35 can be caused to selectively engage with any one of the plurality of gear trains 39.

When the shift drum 37 is angularly displaced from the desired drum angular position to the adjacent drum angular position, the dog gear 35 corresponding to the desired drum angular position is disengaged from the corresponding output gear 39b. Then, after the power cut state in which all the dog gears 35 are disengaged from the output gears 39b, the shift drum 37 reaches the adjacent drum angular position. When the shift drum 37 reaches the adjacent drum angular position, the dog gear 35 corresponding to this drum angular position engages with the corresponding output gear 39b. As above, in the case of changing the transmission stage, the manual transmission 19 once becomes the power cut state in which all the dog gears 35 do not engage with the output gears 39b. While changing the transmission stage, the dog gears 35 other than the dog gear 35 to be engaged and the dog gear 35 to be disengaged do not slide.

Figure 5:
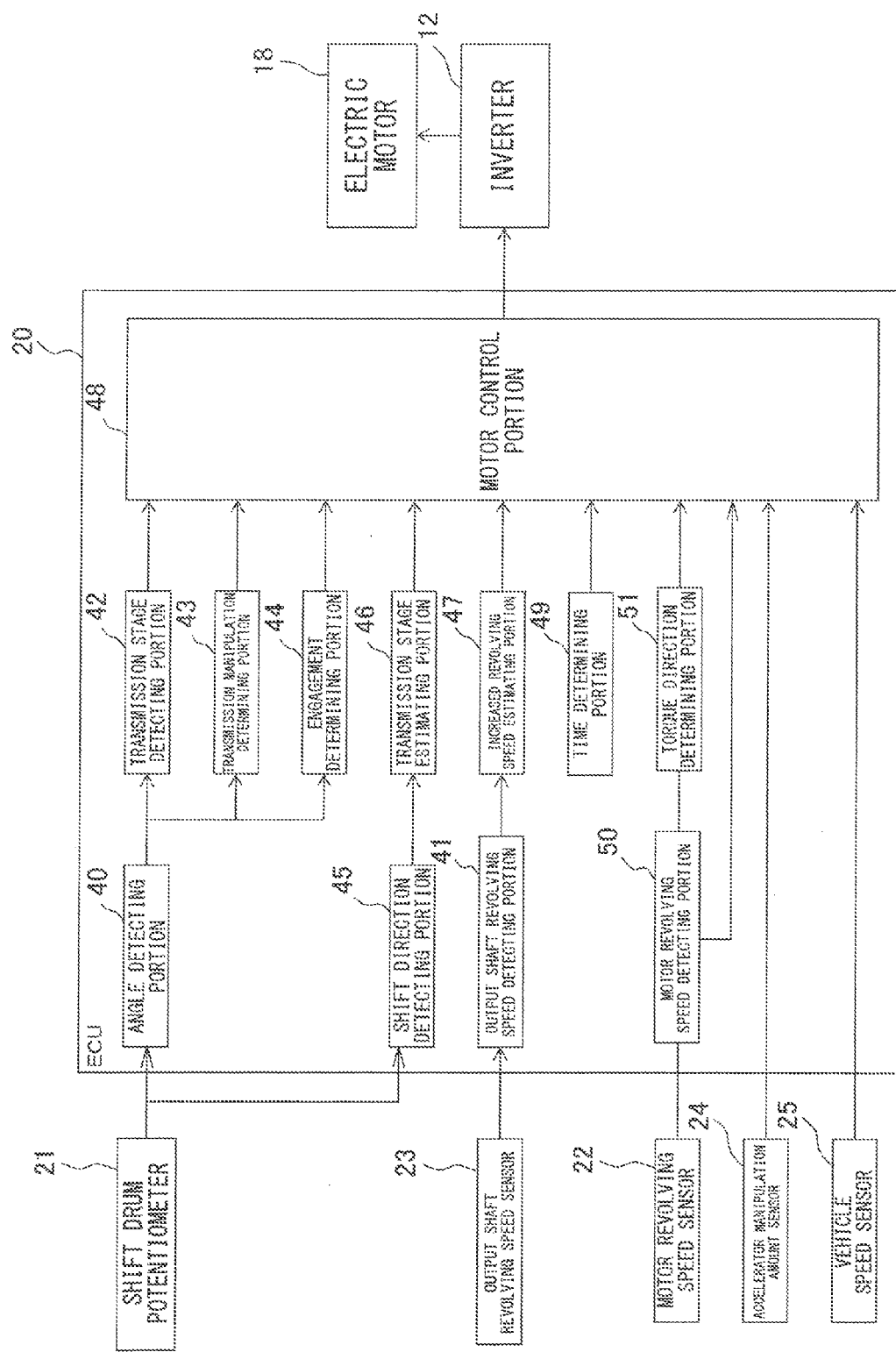
FIG. 5 is a block diagram showing an ECU and inputs and outputs of the ECU.

As shown in FIG. 5, the electric motorcycle 1 configured as above includes a shift drum potentiometer 21, a motor revolving speed sensor 22, an output shaft revolving speed sensor 23, an accelerator manipulation amount sensor 24, and a vehicle speed sensor 25. The shift drum potentiometer 21 is provided at the shift drum 37 and outputs a signal for detecting the rotation angle and rotation direction of the shift drum 37. The motor revolving speed sensor 22 is provided at the output shaft 18a of the electric motor 18 and outputs a signal for detecting the revolving speed of the output shaft 18a.

The output shaft revolving speed sensor 23 is provided at the output shaft 34 and outputs a signal for detecting the revolving speed of the output shaft 34. The accelerator manipulation amount sensor 24 is provided at the accelerator grip 7 and outputs a signal for detecting the accelerator manipulation amount (i.e., a rotation amount) of the accelerator grip 7. The vehicle speed sensor 25 is provided at the front wheel 2 and outputs a signal for detecting a rotating speed (i.e., vehicle speed) of the front wheel 2. The vehicle speed sensor 25 may be provided at the rear wheel 3 and detect the rotating speed of the rear wheel 3. These sensors 21 to 25 are electrically connected to the ECU 20 and output the signals to the ECU 20.

The ECU 20 that is a controller and a switching command detector includes a drum angle detecting portion 40, an output shaft revolving speed detecting portion 41, a transmission stage detecting portion 42, a transmission manipulation determining portion 43, an engagement determining portion 44, a shift direction detecting portion 45, a transmission stage estimating portion 46, an increased revolving speed estimating portion 47, and a motor control portion 48. The angle detecting portion 40 receives the signal from the shift drum potentiometer 21 and detects the rotation angle (phase angle) of the shift drum 37 based on the signal. The output shaft revolving speed detecting portion 41 receives the signal from the output shaft revolving speed sensor 23 and detects the revolving speed of the output shaft 34 based on the signal.

The transmission stage detecting portion 42 detects the current transmission stage (gear position) based on the rotation angle detected by the angle detecting portion 40. Specifically, the transmission stage detecting portion 42 determines whether or not the detected rotation angle of the shift drum 37 coincides with any of the first to sixth drum angular positions. When the detected rotation angle of the shift drum 37 coincides with any of the first to sixth drum angular positions, the transmission stage detecting portion 42 determines that the current transmission stage is the transmission state corresponding to this drum angular position.

Figure 3:
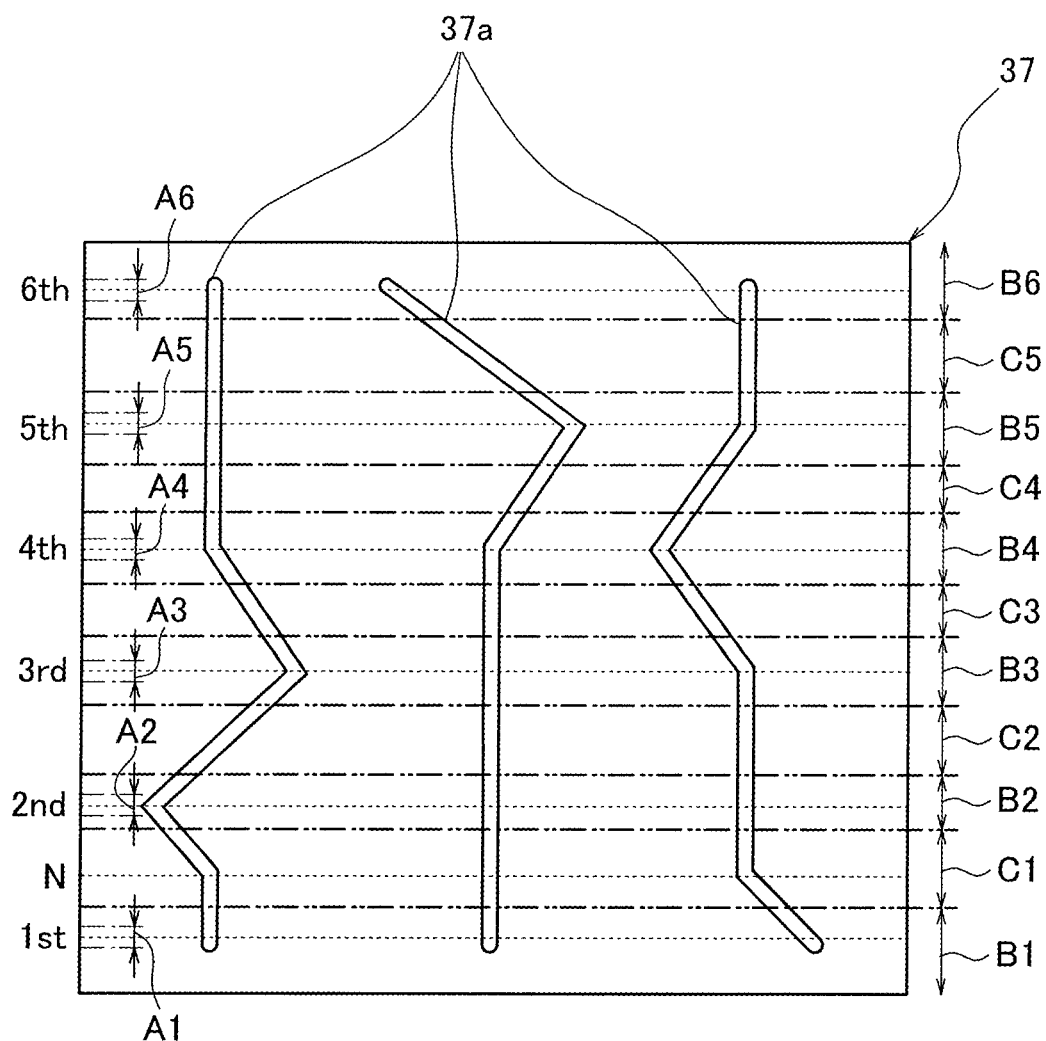
FIG. 3 is a development view showing a shift drum.

Based on the rotation angle detected by the angle detecting portion 40, the transmission manipulation determining portion 43 determines whether or not the transmission manipulation has been performed by the rider. Specifically, dead zones A1 to A6 are set in the shift drum 37 so as to respectively correspond to the transmission stages (see FIG. 3). Each of the dead zones A1 to A6 is set as a predetermined angular range centered around the corresponding drum angular position. Each of the dead zones A1 to A6 is an angular range (i.e., a backlash) in which even when the shift drum 37 is angularly displaced in conjunction with the movement of the shift pedal 30, this displacement is not determined as the transmission manipulation. When the detected rotation angle of the shift drum 37 is within any of the dead zones A1 to A6, the transmission manipulation detecting portion 42 determines that "the transmission manipulation has not been performed." When the detected rotation angle of the shift drum 37 is not within any of the dead zones A1 to A6, the transmission manipulation detecting portion 42 determines that "the transmission manipulation has been performed."

Based on the rotation angle detected by the angle detecting portion 40, the engagement determining portion 44 determines whether or not the dog gear 35 and the output gear 39b are engaged with each other. Specifically, predetermined engagement zones B1 to B6 respectively corresponding to the transmission stages and non-engagement zones C1 to C5 are set in the shift drum 37 (see FIG. 3). Each of the engagement zones B1 to B6 is set so as to substantially coincide with an angular range in which any of the dog gears 35 engages with the corresponding output gear 39b. The other angular ranges (i.e., angular ranges in which all the dog gears 35 are disengaged from the corresponding output gears 39b) are set as the non-engagement zones C1 to C5. When the detected rotation angle of the shift drum 37 is within any of the engagement zones B1 to B6, the engagement determining portion 44 determines that the dog gear 35 and the output gear 39b are in the "engagement state." In contrast, when the detected rotation angle of the shift drum 37 is within any of the non-engagement zones C1 to C6, the engagement determining portion 44 determines that the dog gear 35 and the output gear 39b are in the "non-engagement state."

Regarding all the transmission stages, the ranges of the engagement zones B1 to B6 may be set to be equal to one another. However, the ranges of the engagement zones B1 to B6 may be individually set in accordance with the characteristics of the transmission stages. By individually setting the ranges of the engagement zones B1 to B6, individual transmission determinations can be performed more accurately. For example, the widths of the engagement zones B1 to B6 are set based on a fluctuation width of the signal output from the potentiometer 21 when switching to the specific transmission stage, and other characteristics.

The shift direction detecting portion 45 receives the signal from the shift drum potentiometer 21. The signal from the shift drum potentiometer 21 contains not only information regarding the rotation angle of the shift drum 37 but also information regarding the rotation direction of the shift drum 37. The shift direction detecting portion 45 detects the rotation direction of the shift drum 37 based on the signal from the shift drum potentiometer 21. Further, based on the detected rotation direction, the shift direction detecting portion 45 detects whether or not the transmission manipulation is the shift-up manipulation or the shift-down manipulation. The shift manipulation direction detected as above is input to the transmission stage estimating portion 46 together with the current transmission stage detected by the transmission stage detecting portion 42.

Based on the detected shift manipulation direction and the detected current transmission stage, the transmission stage estimating portion 46 estimates the target transmission stage to which the current transmission stage is switched by the transmission manipulation. Specifically, when the detected shift manipulation direction corresponds to the shift-up manipulation, the transmission stage estimating portion 46 estimates that the target transmission stage is the transmission stage above the current transmission stage by one. In contrast, when the detected shift manipulation direction corresponds to the shift-down, the transmission stage estimating portion 46 estimates that the target transmission stage is the transmission stage below the current transmission stage by one. The transmission stage estimated as above is input to the increased revolving speed estimating portion 47.

The increased revolving speed estimating portion 47 estimates an increased revolving speed that is the revolving speed of the input shaft 31 rotated when the output shaft 34 not connected to the input shaft 31 is connected to the input shaft 31 via the gear train 39. To be specific, the increased revolving speed estimating portion 47 estimates the increased revolving speed of the input shaft 31 rotated when the revolving speed of the output shaft 34 detected by the output shaft revolving speed detecting portion 41 is increased at the speed ratio of the transmission stage estimated by the transmission stage estimating portion 46. The estimated increased revolving speed is input to the motor control portion 48.

In addition to the increased revolving speed, the revolving speed of the output shaft 18a of the electric motor 18 (i.e., the revolving speed of the input shaft 31) is input to the motor control portion 48. The revolving speed of the output shaft 18a of the electric motor 18 is detected by a motor revolving speed detecting portion 50 included in the ECU 20. Specifically, the motor revolving speed detecting portion 50 receives the signal from the motor revolving speed sensor 22 and detects the revolving speed of the output shaft 18a of the electric motor 18 based on the signal. The motor control portion 48 receives the signal from the accelerator manipulation amount sensor 24 and the signal from the vehicle speed sensor 25 and controls the operation of the electric motor 18 through the inverter 12 based on these signals and the detected revolving speed of the output shaft 18a. Further, the motor control portion 48 calculates the output torque or output revolving speed of the electric motor 18 based on information input from the components and controls the operation of the electric motor 18 through the inverter 12 such that the electric motor 18 outputs the calculated torque or the calculated revolving speed.

The ECU 20 further includes a time determining portion 49 and a torque direction determining portion 51. The time determining portion 49 measures a time which has elapsed when a predetermined condition is satisfied and determines whether or not the measured time has exceeded a predetermined time (such as a transition time or a second duration time). The result of the determination is input to the motor control portion 48. The torque direction determining portion 51 detects the direction of the torque, generated by the electric motor 18, based on a change rate (increase/decrease rate) of the revolving speed of the output shaft 18a, the revolving speed being detected by the motor revolving speed detecting portion 50. Specifically, the motor revolving speed detecting portion 50 obtains the revolving speed of the output shaft 18a at every predetermined interval of time. When the newly obtained revolving speed is higher than the revolving speed obtained before the newly obtained revolving speed, the motor revolving speed detecting portion 50 determines that the electric motor 18 is generating forward-direction torque. In contrast, when the newly obtained revolving speed is lower than the revolving speed obtained before the newly obtained revolving speed, the motor revolving speed detecting portion 50 determines that the electric motor 18 is generating backward-direction torque. The forward-direction torque denotes torque acting in such a direction as to accelerate the output shaft 18a when the electric motorcycle 1 moves forward. The backward-direction torque denotes torque in the opposite direction.

When the ECU 20 configured as above determines based on the output result of the potentiometer that the transmission manipulation has been performed by the rider, for the purpose of releasing the engagement between the dog gear 35 and the output gear 39b, the ECU 20 first executes a control operation (first control operation) of controlling the operation of the electric motor 18 to facilitate disengagement of the dog gear 35 from the output gear 39b. After the engagement is released, for the purpose of facilitating the engagement of the dog gear 35 with the output gear 39b, the ECU 20 executes a control operation (second control operation) of controlling the operation of the electric motor 18 to make the revolving speed of the output gear 39b close to the revolving speed of the dog gear 35. According to the electric motorcycle 1, since the ECU 20 executes the above transmission control processing, the transmission operation can be performed without cutting the power transmission between the motor 18 and the manual transmission 19, and the transmission shock at the time of the transmission operation can be suppressed. Hereinafter, a procedure of the transmission control processing by the ECU 20 will be explained in reference to FIGS. 4A to 4C, 6, and 7.

Figure 6:
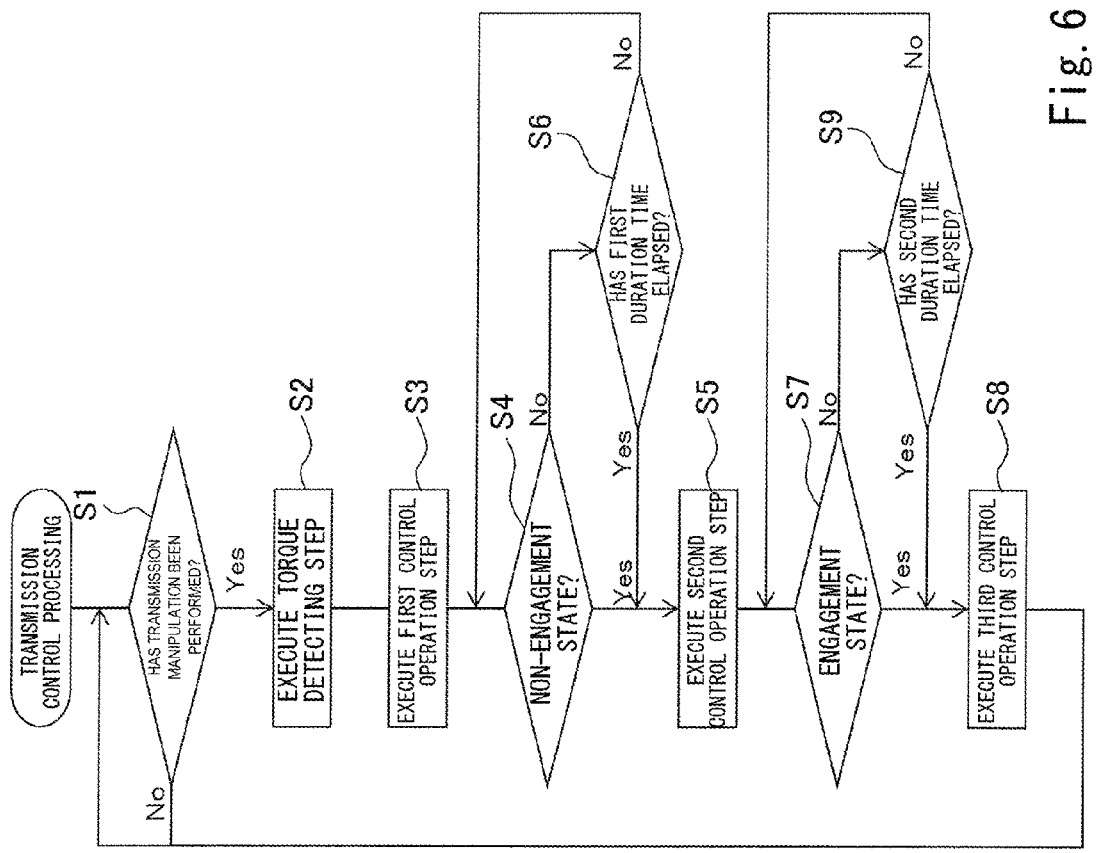
FIG. 6 is a flow chart showing a control operation performed by the ECU at the time of shift-up.

As shown in FIG. 6, when a power supply of the electric motorcycle 1 is turned on, the ECU 20 starts the transmission control processing, and the transmission manipulation determining portion 43 executes a transmission manipulation determining step (Step S1). In the manipulation determining step, the transmission manipulation determining portion 43 determines whether or not the transmission manipulation has been performed. Hereinafter, one example will be explained in reference to FIGS. 7A and 7B. FIG. 7A is a graph showing one example of a change in the rotation angle of the shift drum at the time of the transmission operation. FIG. 7B is a graph showing one example of a change in the torque of the electric motor at the time of the transmission operation. As shown in FIG. 7A, when the transmission manipulation of the shift pedal 30 is not performed or when the transmission manipulation is performed but the rotation angle of the shift drum 37 is within the dead zone A1, the transmission manipulation determining portion 43 determines that "the transmission manipulation has not been performed" and continuously executes the manipulation determining step. In contrast, when the rotation angle of the shift drum 37 gets out of the dead zone A1, the transmission manipulation determining portion 43 determines that "the transmission manipulation has been performed" (see a time t1 in FIG. 7A), and a torque determining step (Step S2) is executed.

In the torque detecting step, the torque direction determining portion 51 determines a direction (hereinafter referred to as a "torque direction") of the output torque of the electric motor 18. For example, when the rider manipulates the accelerator grip 7 to accelerate the electric motorcycle 1, the revolving speed of the output shaft 18a increases with time. Therefore, the torque direction determining portion 51 determines that the torque direction is the forward direction. In contrast, when the rider returns the accelerator grip 7 to an initial position to set the torque of the electric motorcycle 1 to zero, the rear wheel 3 decelerates, and the revolving speed of the output shaft 18a decreases with time. Therefore, the torque direction determining portion 51 determines that the torque direction is the backward direction. When the torque direction is determined as above, a first control operation step (Step S3) is then executed.

In the first control operation step, the ECU 20 controls the operation of the electric motor 18 to facilitate the disengagement of the dog gear 35 from the output gear 39b. Specifically, the motor control portion 48 controls the operation of the electric motor 18 through the inverter 12 such that the output torque of the electric motor 18 becomes substantially zero. At this time, the motor control portion 48 controls the operation of the electric motor 18 such that the electric motor 18 generates engagement release torque acting in a direction opposite to the detected torque direction.

For example, in a case where it is determined in the torque detecting step that the torque direction is the forward direction, the engaging portion 35a of the dog gear 35 meshes with the output gear 39b so as to push the output near 39b in the forward direction (see FIG. 4A). Therefore, as shown in FIG. 7B, the motor control portion 48 controls the operation of the electric motor 18 to cause the electric motor 18 to generate the engagement release torque (backward-direction torque). With this, the engaging portion 35a of the dog gear 35 is separated from the engaging portion 39c of the output gear 39b (see FIG. 4B). When the engagement release torque is high, the engaging portion 35a of the dog gear 35 separated from the engaging portion 39c of the output gear 39b contacts the engaging portion 39c located at the opposite side (see FIG. 4C). In this case, it becomes difficult to disengage the dog gear 35 and the output gear 39b from each other. Therefore, the engagement release torque of the electric motor 18 is adjusted so as to prevent a case where the engaging portion 35a of the dog gear 35 is relatively, angularly displaced too much in the backward direction to contact the engaging portion 39c located at the opposite side. For example, the engagement release torque is set as a predetermined torque of a short time (about 0.1 second), like an impulse, and after the engagement release torque is generated, the output torque of the electric motor 18 is set to about zero. With this, the engaging portion 35a can be prevented from contacting the engaging portion 39c located at the opposite side. The above-described engagement release torque may be generated intermittently. Further, the engagement release torque may be set not as an impulse-like torque but as a torque which continuously, gradually decreases. The magnitude of the engagement release torque may be determined in accordance with the revolving speed of the output shaft 18a of the electric motor 18 or may be constant regardless of the revolving speed of the output shaft 18a of the electric motor 18.

In a case where it is determined in the torque detecting step that the torque direction is the backward direction, the engaging portion 35a of the dog gear 35 meshes with the engaging portion 39c of the output gear 39b so as to push the engaging portion 39c in the backward direction (see FIG. 4C). Therefore, the motor control portion 48 controls the operation of the electric motor 18 to cause the electric motor 18 to generate the engagement release torque (forward-direction torque). With this, the engaging portion 35a of the dog gear 35 is separated from the engaging portion 39c of the output gear 39b (see FIG. 4B). When the generated engagement release torque of the electric motor 18 is high, the engaging portion 35a of the dog gear 35 separated from the output gear 39b contacts the engaging portion 39c located at the opposite side (see FIG. 4A). In this case, it becomes difficult to disengage the dog gear 35 and the output gear 39b from each other. Therefore, the torque of the electric motor 18 is adjusted to prevent a case where the engaging portion 35a of the dog gear 35 is relatively, angularly displaced too much in the forward direction to contact the engaging portion 39c located at the opposite side.

By adjusting the torque of the electric motor 18 as above, the disengagement of the dog gear 35 from the output gear 39b can be facilitated, and the dog gear 35 can be disengaged from the output gear 39b by the transmission manipulation performed by the rider. To cause the electric motor 18 to generate the predetermined torque like the impulse, the motor control portion 48 executes feedforward control. Therefore, a command time can be made shorter than a case where feedback control is executed, and it is possible to prevent a case where the engaging portion 35a is relatively, angularly displaced too much to contact the engaging portion 39c located at the opposite side. Further, by generating the torque in the direction opposite to the torque direction when releasing the engagement, the engagement can be released smoothly even in the case of the quick transmission manipulation. After the first control operation step is executed as above, a first engagement determining step (Step S4) is executed.

In the first engagement determining step, the engagement determining portion 44 determines whether or not the dog gear 35 and the output gear 39b are engaged with each other. When the engagement determining portion 44 determines that the dog gear 35 and the output gear 39b are in the "non-engagement state" (see a time t2 in FIG. 7A), a second control operation step (Step S5) is then executed. In contrast, when the engagement determining portion 44 determines that the dog gear 35 and the output gear 39b are in the "engagement state," a first duration time determining step (Step S6) is executed. In the first duration time determining step, the time determining portion 49 determines whether or not a time has elapsed since it is determined that the transmission manipulation has been performed has exceeded a predetermined first duration time (transition time). When it is determined that the first duration time has not elapsed, the first engagement determining step is executed again. When it is determined that the first duration time has been elapsed, the motor control portion 48 terminates the first control operation step regardless of the engagement relation between the dog gear 35 and the output gear 39b, and a second control operation step (Step S5) is executed.

In the second control operation step, for the purpose of facilitating the engagement of the dog gear 35 with the output gear 39b, the motor control portion 48 controls the operation of the electric motor 18 to make the revolving speed of the output gear 39b close to the revolving speed of the dog gear 35. Specifically, when the second control operation step is started, the transmission stage estimating portion 46 first estimates the target transmission stage to which the current transmission state is switched by the transmission manipulation. Next, the increased revolving speed estimating portion 47 estimates the increased revolving speed based on the revolving speed detected by the output shaft revolving speed detecting portion 41 and the estimated transmission stage. Then, the motor control portion 48 controls the operation of the electric motor 18 based on the estimated increased revolving speed to make the revolving speed of the input shaft 31 close to the increased revolving speed.

The operation of making the revolving speed of the input shaft 31 close to the increased revolving speed will be explained in more detail. After the increased revolving speed is estimated, the motor control portion 48 detects the revolving speed of the output shaft 18a based on the signal from the motor revolving speed sensor 22 and further estimates the revolving speed of the input shaft 31 based on the detected revolving speed. Next, the motor control portion 48 determines whether or not the revolving speed of the input shaft 31 is within a predetermined revolving speed range centered around the increased revolving speed (for example, a range of the increased revolving speed±α (α denotes a predetermined revolving speed)). To suppress the transmission shock at each transmission stage as much as possible, it is preferable that the predetermined revolving speed α be set for each of the transmission stages in accordance with the characteristics of the transmission stages. However, the predetermined revolving speed α may be set to be the same among all the transmission stages. When it is determined that the revolving speed of the input shaft 31 is not within the revolving speed range, the motor control portion 48 controls the operation of the electric motor 18 based on a difference between the revolving speed of the input shaft 31 and the increased revolving speed to make the revolving speed of the input shaft 31 close to the increased revolving speed. In contrast, when it is determined that the revolving speed of the input shaft 31 is within the revolving speed range, the motor control portion 48 controls the operation of the electric motor 18 so as to maintain the revolving speed of the input shaft 31.

For example, in a case where the transmission manipulation is the shift-up manipulation, and it is determined that the revolving speed of the input shaft 31 is not within the revolving speed range, as shown in FIG. 7B, the motor control portion 48 controls the operation of the electric motor 18 such that the electric motor 18 generates predetermined backward-direction torque (in the present embodiment, maximum torque which can be output in the backward direction). With this, the revolving speed of the input shaft 31 decreases, so that the revolving speed of the output gear 39b of the target transmission stage can be made close to the revolving speed of the corresponding dog gear 35. In contrast, in a case where the transmission manipulation is the shift-down manipulation, and it is determined that the revolving speed of the input shaft 31 is not within the revolving speed range, the motor control portion 48 controls the operation of the electric motor 18 such that the electric motor 18 generates predetermined forward-direction torque (in the present embodiment, maximum torque which can be output in the forward direction). With this, the revolving speed of the input shaft 31 increases, so that the revolving speed of the output gear 39b of the target transmission stage can be made close to the revolving speed of the corresponding dog gear 35.

In the second control operation step, when the revolving speed of the output shaft 18a reaches a target revolving speed in any of the shift-up manipulation and the shift-down manipulation, the torque of the electric motor 18 is set to about zero, and the revolving speed of the output shaft 18a is maintained at the target revolving speed. In the case of the shift-up manipulation, the target revolving speed is set to be slightly lower than the increased revolving speed. In the case of the shift-down manipulation, the target revolving speed is set to be slightly higher than the increased revolving speed. By differentiating these revolving speeds as above, it is possible to prevent a case where a state is maintained, in which the dog gear 35 and the output gear 39b rotate and are unable to engage with each other with the engaging portion 35a and the engaging portion 39c opposing each other.

By making the revolving speed of the output gear 39b and the revolving speed of the dog gear 35 close to each other as above, a relative angular velocity between the output gear 39b and the dog gear 35 can be reduced, so that the engagement of the dog gear 35 with the output gear 39b is facilitated. With this, by the transmission manipulation performed by the rider, the dog gear 35 can engage with the output gear 39b of the desired transmission stage. After the revolving speed of the output gear 39b is made close to the revolving speed of the dog gear 35, a second engagement determining step (Step S7) is executed.

In the second engagement determining step, the engagement determining portion 44 determines whether or not the dog gear 35 and the output gear 39b engage with each other. When the engagement determining portion 44 determines that the dog gear 35 and the output gear 39b are in the "engagement state" (see a time t3 in FIG. 7A), a third control step (Step S8) is executed. In contrast, when the engagement determining portion 44 determines that the dog gear 35 and the output gear 39b are in the "non-engagement state," a second duration time determining step (Step S9) is executed. In the second duration time determining step, the time determining portion 49 determines whether or not a time elapsed since the start of the second control operation step has exceeded the predetermined second duration time (termination time). When it is determined that the second duration time has not been elapsed, the second engagement determining step is executed again. In contrast, when it is determined that the second duration time has been elapsed, the motor control portion 48 terminates the second control operation step regardless of the engagement relation between the dog gear 35 and the output gear 39b, and the third control step (Step S7) is executed.

In the third control step, the motor control portion 48 controls the operation of the electric motor 18 based on the accelerator manipulation amount, the revolving speed of the input shaft 31, the rotating speed of the front wheel 2, and the like. To be specific, the electric motorcycle 1 returns to normal control in which the operation of the electric motor 18 is controlled in accordance with the accelerator manipulation amount. When the third control step is executed, the transmission manipulation determining step is again executed, and whether or not the transmission manipulation has been performed is determined. While the power supply of the electric motorcycle 1 is in an on state, the transmission control processing is continuously executed. When the power supply of the electric motorcycle 1 is turned off, the transmission control processing terminates.

According to the electric motorcycle 1 which executes the transmission control processing as above, when releasing the engagement between the dog gear 35 and the output gear 39b, the disengagement of the dog gear 35 from the output gear 39b is facilitated by controlling the operation of the electric motor 18. With this, the transmission operation can be performed without separating the electric motor 18 and the gear train 39 from each other. In addition, when engaging the dog gear 35 and the output gear 39b with each other, the engagement of the dog gear 35 with the output gear 39b is facilitated by controlling the operation of the electric motor 18. With this, the transmission shock generated at the time of the engagement can be suppressed.

According to the electric motorcycle 1, basically, after the engagement determining portion 44 determines that the dog gear 35 and the output gear 39b are in the "non-engagement state," the process proceeds from the first control operation step to the second control operation step. Therefore, it is possible to prevent a case where although the dog gear 35 and the output gear 39b are in the engagement state, the process proceeds to the second control operation step, and therefore, the engagement between the dog gear 35 and the output gear 39b cannot be released. Further, basically, since the second control operation step terminates after the engagement determining portion 44 determines that the dog gear 35 and the output gear 39b are in the "engagement state," it is possible to prevent a case where the second control operation step terminates before the engagement, a relative displacement between the dog gear 35 and the output gear 39b increases by the manipulation of the accelerator or the like, and the engaging portion 35a of the dog gear 35 and the engaging portion 39c of the output gear 39b collide with each other at the time of the engagement to generate the transmission shock.

Further, according to the electric motorcycle 1, when the predetermined first duration time or the predetermined second duration time has elapsed, the first control operation step or the second control operation step is forcibly terminated. Therefore, it is possible to prevent a case where the first control operation step or the second control operation step is continuously executed.

Other Embodiments

The electric motorcycle 1 of the above embodiment is not provided with a clutch mechanism which separates the electric motor 18 and the gear train 39 from each other. However, the electric motorcycle 1 may be provided with the clutch mechanism between the electric motor 18 and the gear train 39. Further, the electric motorcycle 1 of the above embodiment is provided with the shift drum potentiometer 21 for the purpose of detecting or estimating the transmission stage, the transmission manipulation, whether or not the engagement is realized, the shift direction, and the like. However, the shift drum potentiometer 21 is not necessarily required. For example, the electric motorcycle 1 may be provided with a gear position sensor which can detect only a gear position where the dog gear 35 and the output gear 39b mesh with each other. In this case, whether or not the engagement is realized is estimated based on a ratio between the revolving speed of the input shaft 31 and the revolving speed of the output shaft 34. To be specific, in a case where the ratio between the revolving speed of the input shaft 31 and the revolving speed of the output shaft 34 is substantially equal to a revolving speed ratio of the selected transmission stage, it is determined that the dog gear 35 and the output gear 39b are in the engagement state. Except for this case, it is determined that the dog gear 35 and the output gear 39b are in the non-engagement state.

In the above embodiment, the output shaft revolving speed sensor 23 is provided to detect the revolving speed of the output shaft 34. However, instead of the output shaft revolving speed sensor 23, a revolving speed sensor may be provided, which can detect the revolving speed of any rotating body (for example, the rear wheel) located at a power transmission downstream side of the dog gear 35 of the manual transmission 19. In this case, the revolving speed of the output shaft 34 may be calculated in consideration of a reduction ratio determined by the components between the rotating body and the output shaft 34. The engagement mechanism of the manual transmission 19 does not have to be the constant-mesh type (dog gear type) and may be a friction type. The manual transmission 19 may be a transmission mechanism in which the dog gears 35 are arranged at the input shaft 31 side or a transmission mechanism in which the dog gears 35 are arranged at both the input shaft 31 side and the output shaft 34 side. Regarding a gear arrangement, layout, and the like, various existing structures may be adopted.

Further, according to the manual transmission 19, the shift pedal 30 and the shift drum 37 are configured to mechanically operate in conjunction with each other. However, the shift pedal 30 and the shift drum 37 do not have to be configured to mechanically operate in conjunction with each other. For example, the shift pedal 30 is provided with a switch sensor which detects the transmission manipulation, and the switch sensor outputs a signal corresponding to the manipulation direction of the shift pedal 30. The shift drum 37 is provided with a shift drum motor, and the ECU 20 drives the shift drum motor based on a signal from the switch sensor to angularly displace the shift drum 37. Thus, the ECU 20 performs the transmission operation.

As above, the shift pedal 30 and the shift drum 37 are configured to not be mechanically coupled to each other. With this, for example, when it is determined that the first duration time has been exceeded in the first duration time determination, the transmission manipulation can be canceled, and the transmission operation can be prevented from being performed. According to the electric motorcycle 1, the shift pedal is adopted as a shift manipulating element for inputting the switching command. However, a shift lever which can be manipulated by a hand of the rider may be adopted. The shift manipulating element is only required to be a manipulating element which can be manipulated by the rider.

The torque direction determining portion 51 determines the torque direction of the electric motor 18 based on the revolving speed of the output shaft 18a. However, the torque direction of the electric motor 18 may be determined by the other method. For example, the torque direction of the electric motor 18 may be determined based on electric power input from the inverter 12 to the electric motor 18 or based on a control command from the motor control portion 48 to the inverter 12. In a case where the torque direction of the electric motor 18 is determined based on the control command, and when the control command for generating driving torque is output, it is determined that the torque direction is the forward direction. In contrast, when the control command for generating deceleration torque (regenerative torque in the case of below-described regeneration), it is determined that the torque direction is the backward direction.

According to the transmission control processing of the electric motorcycle 1 of the above embodiment, in the first control operation step, the electric motor 18 is caused to generate the backward-direction torque that is torque in a direction opposite to the torque direction of the electric motor 18. However, the electric motor 18 does not have to be caused to generate the backward-direction torque. For example, an absolute value of the torque generated by the electric motor 18 may be reduced to substantially zero. With this, the release of the engagement between the dog gear 35 and the output gear 39b is facilitated without determining the torque direction. Further, inertia of the electric motor 18, the manual transmission 19, and the components between the electric motor 18 and the manual transmission 19 in the electric motorcycle 1 is lower than that in an engine motorcycle. Therefore, in some cases, the engaging portion 35a is excessively, angularly displaced relative to the engaging portion 39c located at the opposite side by a small change in the backward-direction torque. To prevent this excessive relative angular displacement, fine adjustment is performed in the electric motorcycle 1. For example, the value of the backward-direction torque is changed for each revolving speed. However, by reducing the absolute value of the torque generated by the electric motor 18 to about zero, the excessive relative angular displacement can be prevented, and the operation of finely adjusting the value of the torque can be omitted. Further, by reducing the absolute value of the torque generated by the electric motor 18 to about zero, slight torque is applied by rotational resistance to the components at the input shaft 31 side in a direction in which the engaging portion 35a and the engaging portion 39c are separated from each other. With this, force with which the engaging portion 35a and the engaging portion 39c press against each other can be reduced, so that the release of the engagement is facilitated. When the revolving speed of the electric motor 18 is high, and the rotational resistance of the electric motor 18 is high, a decrease amount or decrease time of the torque before the transmission control may be reduced in the first control operation.

According to the transmission control processing of the electric motorcycle 1, when the transmission manipulation is performed, and the first duration time has elapsed since the transmission manipulation while the first control operation step (i.e., the first control operation) is being performed, the first control operation step is terminated, and the second control operation step is executed. However, the third control step may be executed without executing the second control operation step. With this, even when the unintended transmission manipulation determination is executed, the process can quickly return to the third control step.

In the second control operation step (i.e., the second control operation), the motor control portion 48 controls the operation of the electric motor 18 such that the relative angular velocity between the output gear 39b and the dog gear 35 is reduced by making the revolving speeds of the output gear 39b and the dog gear 35, which engage with each other, close to each other. However, the motor control portion 48 may control the operation of the electric motor 18 such that the revolving speeds of the output gear 39b and the dog gear 35 which engage with each other coincide with each other. Further, in the second control operation step, the motor control portion 48 controls the revolving speed of the electric motor 18 such that the revolving speed of the dog gear 35 and the revolving speed of the output gear 39b are made close to each other. However, the control of the revolving speed is not necessarily required. For example, in the case of the shift-up manipulation, the motor control portion 48 may control the operation of the electric motor 18 so as to decelerate the input shaft, and in the case of the shift-down manipulation, the motor control portion 48 may control the operation of the electric motor 18 so as to accelerate the input shaft. With this, the revolving speed of the dog gear 35 and the revolving speed of the output gear 39b can be made close to each other.

According to the electric motorcycle 1 of the above embodiment, when making the revolving speeds close to each other, the motor control portion 48 controls the operation of the electric motor 18 (for example, the feedforward control) such that the electric motor 18 generates predetermined torque. However, the motor control portion 48 may control the torque of the electric motor 18 (for example, the feedback control) based on a deviation between the revolving speed of the output shaft 34 detected by the output shaft revolving speed detecting portion 41 and a target value.

Further, regarding the electric motorcycle 1 of the above embodiment, the regeneration operation is not mentioned. However, regenerative electric power which can be generated by the electric motor 18 at the time of braking may be returned to the battery 11 (not shown) through the inverter 12. In this case, the torque direction may be detected based on the direction of the current flowing through the inverter 12 or the control command (a drive command or a regeneration command) from the motor control portion 48 to the inverter 12.

The above embodiment has explained the electric motorcycle 1. However, the present invention is applicable to any vehicle including a transmission such as the manual transmission 19. In addition to the two-wheeled vehicles, the present invention is applicable to four-wheeled vehicles, three-wheeled vehicles, and personal watercrafts (PWC). A driving source which drives a driving wheel is only required to allow both the revolving speed control and the torque control. The present invention is also applicable to a hybrid vehicle including an internal combustion engine and an electric motor, a fuel cell vehicle including a fuel cell as a power supply, and the like.

REFERENCE CHARACTER LIST 1 electric motorcycle
3 rear wheel
18 electric motor
19 manual transmission
20 ECU
21 shift drum potentiometer
30 shift pedal
31 input shaft
33 engagement mechanism
34 output shaft
39 gear train

The invention claimed is:

1. An electric vehicle comprising:
an electric motor configured to generate torque for rotating a driving wheel;
a transmission device configured to switch over speed ratios in accordance with a switching command obtained based on a transmission manipulation of a rider and transmit the torque of the electric motor to the driving wheel at the switched speed ratio;
a switching command detector configured to detect whether or not the switching command is input; and
a controller configured to control an operation of the electric motor, wherein:
the transmission device includes
an input shaft configured to rotate in conjunction with the electric motor,
an output shaft configured to rotate in conjunction with the driving wheel,
a plurality of transmission gear trains, each of which is provided so as to extend between the input shaft and the output shaft and whose speed ratios are different from one another,
an engagement mechanism configured to selectively engage with any one of the plurality of transmission gear trains and switch between a power transmission state and a power cut state, the power transmission state being a state where the engagement mechanism engages with any one of the transmission gear trains to perform power transmission between the input shaft and the output shaft, the power cut state being a state where the engagement mechanism does not engage with any of the plurality of transmission gear trains to cut the power transmission between the input shaft and the output shaft, and
an engagement state detector configured to detect whether or not the transmission gear train and the engagement mechanism are engaged with each other,
wherein the engagement mechanism switches from the power transmission state to the power cut state by the switching command and engages with a newly selected transmission gear train to return to the power transmission state and therefore switch the speed ratio; and
in a case where the controller determines based on a detection result of the switching command detector that the switching command is input,
for facilitating disengagement of the engagement mechanism from the transmission gear train when switching from the power transmission state to the power cut state, the controller executes a first control operation of controlling the operation of the electric motor,
for facilitating engagement of the engagement mechanism with the newly selected transmission gear train when returning from the power cut state to the power transmission state, the controller executes a second control operation of controlling the operation of the electric motor to make a revolving speed of the newly selected transmission gear train close to the revolving speed of the engagement mechanism,
when the engagement state detector detects in the first control operation that the transmission gear train and the engagement mechanism are not engaged with each other, the controller proceeds to the second control operation, and
when the engagement state detector detects in the second control operation that the transmission gear train and the engagement mechanism are engaged with each other, the controller terminates the second control operation.

2. The electric vehicle according to claim 1, wherein:
the switching command detector detects whether the switching command is a shift-down command or a shift-up command;
when the switching command detector detects that the switching command is the shift-down command, the controller controls the operation of the electric motor in the second control operation such that the revolving speed of the input shaft is made higher than the revolving speed of the input shaft at the time of the input of the switching command; and
when the switching command detector detects that the switching command is the shift-up command, the controller controls the operation of the electric motor in the second control operation such that the revolving speed of the input shaft is made lower than the revolving speed of the input shaft at the time of the input of the switching command.

3. The electric vehicle according claim 1, wherein:
when a predetermined termination time has elapsed in the first control operation, the controller terminates the first control operation; and
when a predetermined termination time has elapsed in the second control operation, the controller terminates the second control operation.

4. The electric vehicle according to claim 1, further comprising a shift manipulating element by which the rider inputs the switching command, wherein
the transmission device mechanically operates in conjunction with the shift manipulating element.

5. The electric vehicle according to claim 1, wherein the controller causes the electric motor to generate release torque to facilitate the disengagement of the engagement mechanism from the transmission gear train, the release torque being torque acting in a direction opposite to a direction of the torque of the electric motor before the first control operation.

6. The electric vehicle according to claim 5, wherein after the electric motor generates the release torque in the first control operation, the controller sets the release torque of the electric motor to substantially zero.

7. The electric vehicle according to claim 5, wherein the controller causes the electric motor to intermittently generate the release torque.

8. The electric vehicle according to claim 5, wherein the controller causes the electric motor to generate the release torque which continuously, gradually decreases.

9. The electric vehicle according to claim 5, wherein the controller changes magnitude of the release torque in accordance with the revolving speed of the electric motor.

10. The electric vehicle according to claim 1, wherein when the controller controls the operation of the electric motor in the first control operation, the controller performs feedforward control of the revolving speed of the electric motor.

11. The electric vehicle according to claim 1, wherein the controller causes the electric motor to generate maximum torque in the second control operation to make a revolving speed of the newly selected transmission gear train close to the revolving speed of the engagement mechanism, the maximum torque being output in a direction opposite to a direction in which the input shaft rotates.

12. An electric vehicle comprising:
an electric motor configured to generate torque for rotating a driving wheel;
a transmission device configured to switch over speed ratios in accordance with a switching command obtained based on a transmission manipulation of a rider and transmit the torque of the electric motor to the driving wheel at the switched speed ratio;
a switching command detector configured to detect whether or not the switching command is input; and
a controller configured to control an operation of the electric motor, wherein:
the transmission device includes
an input shaft configured to rotate in conjunction with the electric motor,
an output shaft configured to rotate in conjunction with the driving wheel,
a plurality of transmission gear trains, each of which is provided so as to extend between the input shaft and the output shaft and whose speed ratios are different from one another, and
an engagement mechanism configured to selectively engage with any one of the plurality of transmission gear trains and switch between a power transmission state and a power cut state, the power transmission state being a state where the engagement mechanism engages with any one of the transmission gear trains to perform power transmission between the input shaft and the output shaft, the power cut state being a state where the engagement mechanism does not engage with any of the plurality of transmission gear trains to cut the power transmission between the input shaft and the output shaft,
wherein the engagement mechanism switches from the power transmission state to the power cut state by the switching command and engages with a newly selected transmission gear train to return to the power transmission state and therefore switch the speed ratio; and
in a case where the controller determines based on a detection result of the switching command detector that the switching command is input,
for facilitating disengagement of the engagement mechanism from the transmission gear train when switching from the power transmission state to the power cut state, the controller executes a first control operation of controlling the operation of the electric motor,
for facilitating engagement of the engagement mechanism with the newly selected transmission gear train when returning from the power cut state to the power transmission state, the controller executes a second control operation of controlling the operation of the electric motor to make a revolving speed of the newly selected transmission gear train close to the revolving speed of the engagement mechanism, and
wherein when a predetermined transition time has elapsed in the first control operation, the controller proceeds to the second control operation.

13. An electric vehicle comprising:
an electric motor configured to generate torque for rotating a driving wheel;
a transmission device configured to switch over speed ratios in accordance with a switching command obtained based on a transmission manipulation of a rider and transmit the torque of the electric motor to the driving wheel at the switched speed ratio;
a switching command detector configured to detect whether or not the switching command is input; and
a controller configured to control an operation of the electric motor, wherein:
the transmission device includes
an input shaft configured to rotate in conjunction with the electric motor,
an output shaft configured to rotate in conjunction with the driving wheel,
a plurality of transmission gear trains, each of which is provided so as to extend between the input shaft and the output shaft and whose speed ratios are different from one another, and
an engagement mechanism configured to selectively engage with any one of the plurality of transmission gear trains and switch between a power transmission state and a power cut state, the power transmission state being a state where the engagement mechanism engages with any one of the transmission gear trains to perform power transmission between the input shaft and the output shaft, the power cut state being a state where the engagement mechanism does not engage with any of the plurality of transmission gear trains to cut the power transmission between the input shaft and the output shaft,
wherein the engagement mechanism switches from the power transmission state to the power cut state by the switching command and engages with a newly selected transmission gear train to return to the power transmission state and therefore switch the speed ratio; and
in a case where the controller determines based on a detection result of the switching command detector that the switching command is input,
for facilitating disengagement of the engagement mechanism from the transmission gear train when switching from the power transmission state to the power cut state, the controller executes a first control operation of controlling the operation of the electric motor,
for facilitating engagement of the engagement mechanism with the newly selected transmission gear train when returning from the power cut state to the power transmission state, the controller executes a second control operation of controlling the operation of the electric motor to make a revolving speed of the newly selected transmission gear train close to the revolving speed of the engagement mechanism,
wherein the controller causes the electric motor to generate release torque to facilitate the disengagement of the engagement mechanism from the transmission gear train, the release torque being torque acting in a direction opposite to a direction of the torque of the electric motor before the first control operation, and wherein the controller causes the electric motor to generate the release torque of a short time like an impulse.

14. An electric vehicle comprising:

an electric motor configured to generate torque for rotating a driving wheel;

a transmission device configured to switch over speed ratios in accordance with a switching command obtained based on a transmission manipulation of a rider and transmit the torque of the electric motor to the driving wheel at the switched speed ratio;

a switching command detector configured to detect whether or not the switching command is input; and a controller configured to control an operation of the electric motor, wherein:

the transmission device includes an input shaft configured to rotate in conjunction with the electric motor, an output shaft configured to rotate in conjunction with the driving wheel, a plurality of transmission gear trains, each of which is provided so as to extend between the input shaft and the output shaft and whose speed ratios are different from one another, and an engagement mechanism configured to selectively engage with any one of the plurality of transmission gear trains and switch between a power transmission state and a power cut state, the power transmission state being a state where the engagement mechanism engages with any one of the transmission gear trains to perform power transmission between the input shaft and the output shaft, the power cut state being a state where the engagement mechanism does not engage with any of the plurality of transmission gear trains to cut the power transmission between the input shaft and the output shaft, wherein the engagement mechanism switches from the power transmission state to the power cut state by the switching command and engages with a newly selected transmission gear train to return to the power transmission state and therefore switch the speed ratio; and in a case where the controller determines based on a detection result of the switching command detector that the switching command is input, for facilitating disengagement of the engagement mechanism from the transmission gear train when switching from the power transmission state to the power cut state, the controller executes a first control operation of controlling the operation of the electric motor, for facilitating engagement of the engagement mechanism with the newly selected transmission gear train when returning from the power cut state to the power transmission state, the controller executes a second control operation of controlling the operation of the electric motor to make a revolving speed of the newly selected transmission gear train close to the revolving speed of the engagement mechanism, the switching command detector detects a shift-up command as the switching command;

the controller estimates an increased revolving speed that is the revolving speed of the input shaft when the input shaft and the output shaft, which have been separated from each other by the engagement mechanism, are connected to each other; and when the switching command detector detects the shift-up command, the controller controls the operation of the electric motor in the second control operation such that the input shaft rotates at the revolving speed lower than the increased revolving speed.

15. An electric vehicle comprising:

an electric motor configured to generate torque for rotating a driving wheel;

a transmission device configured to switch over speed ratios in accordance with a switching command obtained based on a transmission manipulation of a rider and transmit the torque of the electric motor to the driving wheel at the switched speed ratio;

a switching command detector configured to detect whether or not the switching command is input; and a controller configured to control an operation of the electric motor, wherein:

the transmission device includes an input shaft configured to rotate in conjunction with the electric motor, an output shaft configured to rotate in conjunction with the driving wheel, a plurality of transmission gear trains, each of which is provided so as to extend between the input shaft and the output shaft and whose speed ratios are different from one another, and an engagement mechanism configured to selectively engage with any one of the plurality of transmission gear trains and switch between a power transmission state and a power cut state, the power transmission state being a state where the engagement mechanism engages with any one of the transmission gear trains to perform power transmission between the input shaft and the output shaft, the power cut state being a state where the engagement mechanism does not engage with any of the plurality of transmission gear trains to cut the power transmission between the input shaft and the output shaft, wherein the engagement mechanism switches from the power transmission state to the power cut state by the switching command and engages with a newly selected transmission gear train to return to the power transmission state and therefore switch the speed ratio; and in a case where the controller determines based on a detection result of the switching command detector that the switching command is input, for facilitating disengagement of the engagement mechanism from the transmission gear train when switching from the power transmission state to the power cut state, the controller executes a first control operation of controlling the operation of the electric motor, for facilitating engagement of the engagement mechanism with the newly selected transmission gear train when returning from the power cut state to the power transmission state, the controller executes a second control operation of controlling the operation of the electric motor to make a revolving speed of the newly selected transmission gear train close to the revolving speed of the engagement mechanism, the switching command detector detects a shift-down command as the switching command;

the controller estimates an increased revolving speed that is the revolving speed of the input shaft when the input shaft and the output shaft, which have been separated from each other by the engagement mechanism, are connected to each other; and when the switching command detector detects the shift-down command, the controller controls the operation of the electric motor in the second control operation such that the input shaft rotates at the revolving speed higher than the increased revolving speed.

* * * * *